US010904246B2

(12) United States Patent
Chari et al.

(10) Patent No.: US 10,904,246 B2
(45) Date of Patent: Jan. 26, 2021

(54) SINGLE CHANNEL INPUT MULTI-FACTOR AUTHENTICATION VIA SEPARATE PROCESSING PATHWAYS

(71) Applicant: International Business Machines Corporation, Armonk, NY (US)

(72) Inventors: Suresh Chari, Scarsdale, NY (US); Zhongshu Gu, Ridgewood, NJ (US); Heqing Huang, Mahwah, NJ (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/018,252

(22) Filed: Jun. 26, 2018

(65) Prior Publication Data

US 2019/0394195 A1 Dec. 26, 2019

(51) Int. Cl.
| | |
|---|---|
| *H04L 29/06* | (2006.01) |
| *G06F 21/32* | (2013.01) |
| *G10L 17/24* | (2013.01) |
| *G06F 3/0488* | (2013.01) |
| *G06F 3/041* | (2006.01) |
| *G10L 17/02* | (2013.01) |

(52) U.S. Cl.
CPC ........ *H04L 63/0861* (2013.01); *G06F 3/0414* (2013.01); *G06F 3/04883* (2013.01); *G06F 21/32* (2013.01); *G10L 17/02* (2013.01); *G10L 17/24* (2013.01); *H04L 63/18* (2013.01); *G06F 2221/2103* (2013.01); *H04L 2463/082* (2013.01)

(58) Field of Classification Search
CPC ................. H04L 63/0861; H04L 63/18; H04L 2463/082; H04L 63/08; G10L 17/02; G10L 17/24; G06F 3/0414; G06F 3/04883; G06F 21/32; G06F 2221/2103
USPC .......................................................... 726/7
See application file for complete search history.

(56) References Cited

U.S. PATENT DOCUMENTS

| | | | |
|---|---|---|---|
| 2008/0208580 A1 | 8/2008 | Scholl | |
| 2010/0328035 A1 | 12/2010 | Hanley et al. | |
| 2013/0312061 A1* | 11/2013 | Casals Andreu | ....... G06F 21/40 726/3 |

(Continued)

*Primary Examiner* — Kambiz Zand
*Assistant Examiner* — Aubrey H Wyszynski
(74) *Attorney, Agent, or Firm* — Stephen J. Walder, Jr.; Jeffrey S. LaBaw

(57) ABSTRACT

Mechanisms are provided to implement a single input, multi-factor authentication (SIMFA) system. The SIMFA system receives a user input for authenticating a user via a single input channel and provides the user input to first authentication logic of an explicit channel of the SIMFA system, where in the first authentication logic performs a knowledge authentication operation on the user input. The SIMFA system further provides the user input to second authentication logic of one or more side channels of the SIMFA system, where the second authentication logic performs authentication on non-knowledge-based characteristics of the user input. The SIMFA system combines results of the first authentication logic and the second authentication logic to generate a final determination of authenticity of the user. The SIMFA system generates an output indicating whether the user is an authentic user or a non-authentic user based on the final determination of authenticity of the user.

23 Claims, 3 Drawing Sheets

(56) References Cited

U.S. PATENT DOCUMENTS

| | | | |
|---|---|---|---|
| 2014/0358535 A1* | 12/2014 | Lee | G10L 15/22 |
| | | | 704/233 |
| 2015/0156328 A1 | 6/2015 | Arslan et al. | |
| 2016/0337346 A1* | 11/2016 | Momchilov | H04W 12/0023 |
| 2017/0351487 A1* | 12/2017 | Aviles-Casco Vaquero | |
| | | | G06F 3/167 |
| 2018/0144615 A1* | 5/2018 | Kinney | G06K 9/00362 |
| 2018/0285539 A1* | 10/2018 | Agarwal | G06F 21/316 |

\* cited by examiner

SINGLE CHANNEL INPUT MULTI-FACTOR AUTHENTICATION VIA SEPARATE PROCESSING PATHWAYS

BACKGROUND

The present application relates generally to an improved data processing apparatus and method and more specifically to mechanisms for performing multi-factor authentication of a single channel input using separate processing pathways.

Computer security, or cybersecurity, is of ever increasing importance in modern society as society becomes more and more dependent upon computers, data networks, and other information technology systems used to assist with and control various aspects of people's daily lives. Increasingly, people utilize computer systems to hold their personal information, hold their financial information, perform business transactions, perform information exchanges, etc. More sensitive information is maintained in and/or transferred by computer or information technology systems today than ever before in history.

Cybersecurity, computer security, or information technology security is comprised of a variety of mechanisms, provided in software and/or hardware, for protecting computer systems from theft and damage to their hardware, software, or information, as well as protecting such systems from disruption of service, misdirection of services, or the like. These mechanisms involve various software and/or hardware mechanisms for controlling physical access to the hardware, as well as protecting against harm that may come via network access, data and code injection, and the like. The field of cybersecurity, compute security, and information technology security is of growing importance due to the increasing reliance on computer systems and the Internet, wireless networks such as Bluetooth and Wi-Fi, the growth of "smart" devices, including smartphones, televisions and tiny devices as part of the Internet of Things (IoT), and other advances in computer based technology.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions that are executed by the processor to configure the processor to implement a single input, multi-factor authentication (SIMFA) system. The method comprises receiving, by the SIMFA system, a user input for authenticating a user via a single input channel and providing, by the SIMFA system, the user input to first authentication logic of an explicit channel of the SIMFA system, where in the first authentication logic performs a knowledge authentication operation on the user input. The method further comprises providing, by the SIMFA system, the user input to second authentication logic of one or more side channels of the SIMFA system, where the second authentication logic performs authentication on one or more non-knowledge-based characteristics of the user input. Moreover, the method comprises combining, by the SIMFA system, results of operations of the first authentication logic and the second authentication logic to generate a final determination of an authenticity of the user. In addition, the method comprises generating, by the SIMFA system, an output indicating whether the user is an authentic user or a non-authentic user based on the final determination of authenticity of the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
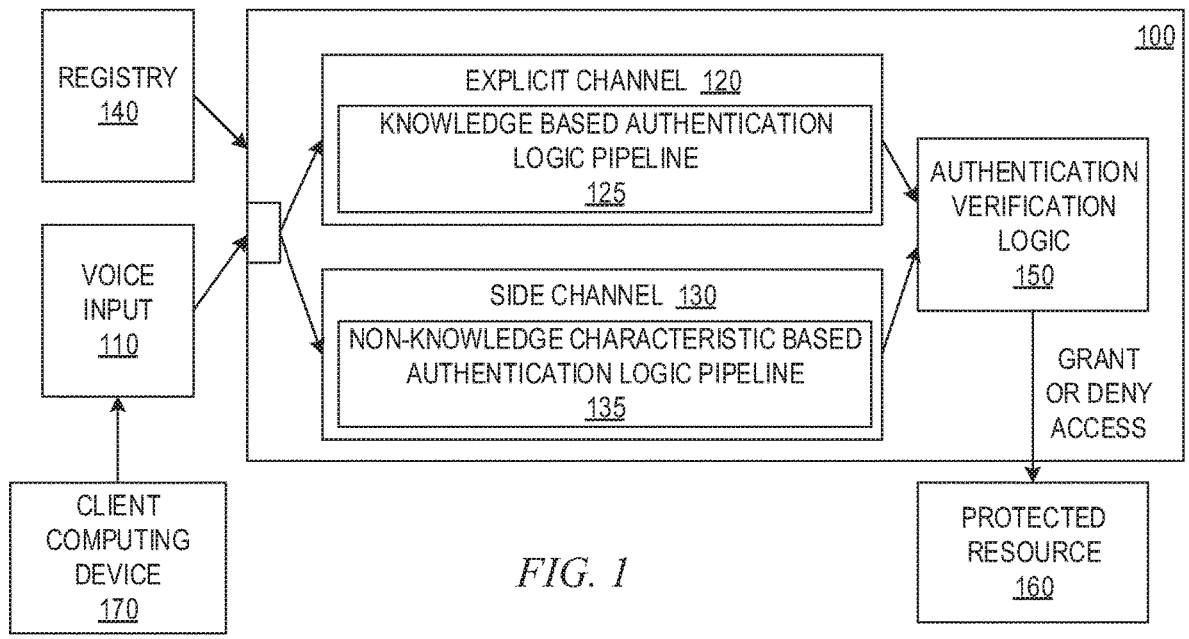
FIG. 1 is an example diagram illustrating an overall single-input multi-factor authentication protocol and process in accordance with one illustrative embodiment.

One type of cybersecurity implemented in many online computer environments, is user authentication protocols. Such user authentication protocols may involve users wishing to access a computing resource being presented with an authentication prompt and responding with personal information or a valid response, i.e. credentials, that may be authenticated against stored information. For example, a user logon process is one type of authentication protocol in which a user is presented with a prompt to enter their username and password, and this information may then be validated against stored information in order to determine whether or not to permit a user to access a computing resource. The authentication information may be provided in multiple different formats including voice input, text input, gesture input, and the like.

User authentication is a long-lasting and evolving area in cybersecurity. User authentication changes dramatically with the emergence of new computing devices, e.g., virtual reality, augmented reality, cyber-physical systems (CPS), Internet of Things (IoT), and the like. These devices may not bestow conventional input/output (I/O) interfaces, e.g., keyboards, mice, and monitors, for users to enter their credentials for authentication. Recently, biometric-based authentication methods have been developed to accommodate the changes in human-computer interface of these emerging computing devices. Such biometric-based authentication methods may include fingerprint methods, voiceprint methods, retinal scan methods, etc.

For example, voiceprint-based authentication can identify a person from the characteristics of his or her voice. The user can speak directly to the device which has a microphone or other audio capture device, in order to issue commands to the device without explicitly entering the password. The device may have software and previous voiceprint information to which the user's voice input may be compared in order to authenticate the user.

However, it is worth noting that simply relying on biometric-based authentication is vulnerable to forgery attacks. For the specific scenario of voiceprint authentication, an attacker can record a voice sample of a victim, such as through a phone call or a personal conversation, and the attacker can use the recorded sample to circumvent the authentication by posing as the user using the recorded sample or synthesized voice input based on the recorded sample that emulates the authorized user's voice. Moreover, other single-factor authentication mechanisms, such as username/password authentication, are likewise susceptible to forgery attacks as they only require that the attacker be able to capture the correct response to the security prompt in order to pose as the authorized user.

Thus, it is important to adopt a multi-factor authentication methodology, such as a two-factor authentication, i.e., combining two independent authentication methods to reduce the attack surface and mitigate the chance for attackers to succeed. Existing two-factor authentication methodologies, however, require back-and-forth communication in multiple rounds and may involve multiple devices, leading to a tedious mechanism that is not user friendly. That is, two-factor authentication mechanisms require that the user provide two different inputs, using different channels of input and different devices, with each separate factor being separately authenticated. In other words, the two-factor authentication mechanisms are essentially just single-factor authentication mechanisms that have been joined at a back-end software level which evaluates the separate results of the two separate input channels to determine whether the user is authenticated or not. For example, a user may provide a voice input that passes the voiceprint authentication and, in a second round of authentication, the system may require calling the user's phone, sending an email to the user's computer, outputting an authentication code on the user's mobile phone which must then be entered into the user's computer, etc. to verify the identity of the user.

This leads to a clunky and non-user friendly mechanisms that often times causes frustration on the part of the authorized user. For example, the user may be required to provide an input via their mobile phone, a mobile authenticator mechanism, or the like, but may not have immediate access to the device, is in an area where mobile communication is not able to be made, or the second round of authentication cannot be completed due to device limitations. As a result, the two-factor authentication will fail and the legitimate user will be blocked from using their devices properly or blocked from accessing computing system resources that they should otherwise have access to.

In view of these aforementioned issues with biometric-based and multi-factor authentication methods, the illustrative embodiments provide a shared-channel multi-factor authentication mechanism that is more user-friendly than known mechanisms which utilize single-factor authentication or utilize separate input channels and devices to separately provide authentication factors in a multi-factor authentication methodology requiring users to provide multiple inputs via different devices or different interfaces. The illustrative embodiments can efficiently render authentication attacks ineffective without adding additional burdens to legitimate users.

Instead of establishing a two-round communication in traditional two-factor authentication, the illustrative embodiments require only a single input of user credentials. The credential input received via a single input channel is partitioned into multiple independent paths of processing through multiple different processing pipelines, where the partitioning into these multiple different processing pipelines may occur such that the multiple different processing pipelines may process the credential input at approximately or substantially a same time using parallel paths of processing. In general, the credential input may be partitioned into explicit-channel and one or more side-channel data inputs. The data in the explicit-channel can be used for knowledge based authentication, e.g., security question answer authentication, pattern knowledge authentication, etc., by an explicit-channel processing pipeline, while the one or more side-channel processing pipelines may process one or more partitioned sub-sets of data extracted from the single input to uniquely identify the user through non-knowledge based authentication, e.g., voiceprint authentication, biometric based characteristic authentication, etc. Thus, the mechanisms of the illustrative embodiments enable multi-factor authentication using a single input channel with additional logic and processing pipeline mechanisms being provided to partition the single input channel input into multiple data inputs for separate processing by different side-channel processing pipelines for the multi-factor authentication.

It should be appreciated that while the illustrative embodiments will be described in the context of a voice-based input and voice authentication of a user for obtaining access to protected resources, which may be protected information, protected computing systems, protected data structures, physical access to physical resources, or the like, the illustrative embodiments are not limited to such. Rather, the mechanisms of the illustrative embodiments may be used with any single input of various types which may be partitioned into separate channels of data for multi-factor authentication. For example, the illustrative embodiments may operate on gesture input through various input mechanisms to which both an explicit channel knowledge-based authentication may be performed, and with which one or more side-channel input pattern analysis may be performed to uniquely authenticate the user. Similarly, keyboard or other user interface-based term/identifier input may be authenticated via a single input and multi-factor analysis as described hereafter.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments provide mechanisms for using a single input channel to perform multi-factor authentication avoiding the need to have multiple different inputs, one for each factor of authentication. With the mechanisms of the illustrative embodiments, a single input is received in the computing system from an input device (e.g., in a stand-alone computing system embodiment) and/or other computing system (e.g., in a distributed networked computing environment embodiment) via a single input channel. The single input is partitioned into multiple different data processing channels where the single input is processed through different processing pipelines to perform different types of authentication on the single input. The processing via the different processing pipelines of the different channels may comprise parallel processing of the single input at substantially or approximately the same time with different aspects of the single input being processed with regard to different authentication protocols. For example, in a first channel, a knowledge-based authentication may be performed in which the input is analyzed to determine if the input is indicative of the user providing the input having a portion of secret knowledge particular to an authorized user. In other channels, the input is processed to determine if other non-knowledge-based characteristics of the input are indicative of a unique authorized user. The results of the various processing pipelines operating on their respective data channels are combined to generate a scoring of a likelihood that the input is from an authorized user. Based on the scoring generated, a determination is made as to whether the user is authentic and corresponding access to the resource for which access is requested is either granted or denied based on the result of the determination.

FIG. 1 is an example diagram illustrating an overall single-input multi-factor authentication protocol and process in accordance with one illustrative embodiment. FIG. 1 depicts an example in which the input received is a voice input, such as may be captured by an audio capture device, e.g., a microphone, where the audio signals are converted to a digital data representation as is generally known in the art. Using a voice input example for illustrative purposes, as shown in FIG. 1, given a voice input 110 of a user speaking an authentication word, phrase, password, or the like, the mechanisms according to one illustrative embodiment partition the voice input 110 into separate data channels 120-130. In one illustrative embodiment, the separate data channels 120, 130 may comprise an explicit channel 120 and one or more side-channels 130. For purposes of illustration, only a single side-channel 130 and corresponding processing pipeline are shown such that a two-factor authentication is made possible with a single voice input. However, in other illustrative embodiments, multiple side-channels 130 may be provided with corresponding processing pipelines to perform authentication using greater than two factors.

The term "partition" as it is used herein refers to different information being extracted from the same input, e.g., voice input 110, where the different information belongs to different aspects of the same input. The extracted information for different paths, e.g., explicit channel 120 and the one or more side channels 130, may or may not overlap, depending on the implementation. In addition, the extracted information does not need to be in the same form. For example, using the voice input 110 example, one path may process extracted information corresponding to extracted security answers obtained from the voice input, where this processing may comprise speech recognition and understanding of natural language. For this path, the portion of the voice input 110 provided to the path may comprise the whole voice input 110 data. For another path, e.g., a side path that is concerned with characteristics of the speaker's voiceprint, the voiceprint characteristics may be extracted and processed to identify the speaker. The input to the side channel pathway may still comprise the whole voice input 110 data or may comprise only the extracted voiceprint characteristics that may be extracted from an upstream mechanism prior to providing to the individual paths of the explicit and side channels.

As shown in FIG. 1, the explicit channel 120 has an associated processing pipeline 125 which comprises various analytics logic for analyzing the voice input 110 to perform knowledge-based authentication. In one illustrative embodiment, the processing pipeline 125 comprises logic for performing speech recognition operations to extract the content present in the voice input 110 and match the content to authentication knowledge associated with the identity of the user that the source of the voice input 110 purports to be. For example, the user may submit a user identifier, such as via a logon process, a device or system identifier associated with a device or system from which the voice input is received, and which may be sent along with the voice input 110 may be used to identify the user, etc. This user identifier information may then be used to perform a lookup operation in a registry database 140 to retrieve authentication information for the user identifier, where this authentication information may comprise authentication knowledge, e.g., answers to security questions, passwords, alphanumeric codes, or any other value, word, phrase, or other knowledge that may be used to authenticate the user.

The analytics of the pipeline 125 may perform speech-to-text conversion in order to identify the content of the voice input 110 and then may compare the textual version of the content of the voice input 110 to the retrieved authentication information associated with the user, e.g., compare the word, phrase, etc. spoken by the user and present in the voice input 110 to the stored authentication word, phrase, etc. associated with the authentic user that the source of the voice input 110 purports to be. If the text and the stored authentication information match, then the source of the voice input 110 is authenticated as far as the knowledge authentication is concerned, i.e. based on the knowledge authentication, the user appears to be the authentic user that the user claims to be. For example, in the case of a password or passphrase, the user may speak the password, passphrase, answer to a security question, or the like, this spoken input is captured by the microphone and converted from audio signals to a digital format by the computing device associated with the microphone. This voice data is then processed by the computing device or transmitted to an authentication computing system in the case of a distributed environment embodiment, as voice input 110 by performing a knowledge authentication on the content of the voice input 110 based on authentication information stored in association with an identity of the authentic user that the source of the voice input claims to be. If there is a match, then the user (or source of the voice input 110) is authenticated. If there is not a match, then the user is not authenticated.

It should be appreciated that while knowledge-based authentication is one way to authenticate a user, its major weakness is that some knowledge which is supposed to be secret to the authentic user, may in fact be able to be found out through research on the user, through password cracking attempts, and the like. Thus, to increase the security of the protected resource, a multi-factor authentication may be employed using mechanisms of the illustrative embodiments such that authentication is not based only on a knowledge authentication process. That is, the illustrative embodiments provide parallel paths of authentication processing based on a single input in order to facilitate a more secure, multi-factor, authentication without requiring the user to provide multiple rounds of user input.

Thus, as shown in FIG. 1, one or more parallel paths of processing, the same voice input 110 is further processed along one or more side-channel paths of processing, such as side-channel 130 having processing pipeline 135 which comprises various analytics logic for analyzing the voice input 110 to perform non-knowledge-based authentication based on one or more non-knowledge content based characteristics of the voice input 110. In one illustrative embodiment, as shown in FIG. 1, this side-channel 130 comprises a processing pipeline 135 that comprises analytics logic for performing voice recognition operations based on a voice print associated with an authentic user as may be retrieved from the registry 140. The voice print comprises various audio characteristics of the authentic user captured during training of the system or otherwise captured from previous voice inputs from the authentic user such that the voice characteristics of the user are represented in the voice print, e.g., tone, pitch, volume, cadence of speaking, accents, etc.

The processing pipeline 135 receives the voice input 110 at approximately a same time as the processing pipeline 125 of the explicit channel 120 and operates on the voice input 110 to extract the voice print present within the voice input 110, i.e. the input voice print. Similar to processing pipeline 125, authentication information is retrieved from the registry 140 to use with the voiceprint authentication performed by the side channel 130 and its processing pipeline 135. That is, the authentication information stored in the registry 140 may comprise the authentic voiceprint information for the authentic user. The input voiceprint information extracted from the voice input 110 may be compared to the authentic voiceprint information retrieved from the registry to determine if there is a match or not. It should be appreciated that the match may be determined based on a fuzzy matching methodology due to the inherent variability of voice input even from the same speaker. For example, this fuzzy matching methodology may comprise a confidence score-based evaluation, e.g., evaluating various characteristics of the voiceprints to determine degree of matching of the various characteristics which may then be used to generate a numeric score that is compared to a threshold value indicative of whether the voiceprints match or not.

As mentioned previously, while FIG. 1 shows only two channels 120, 130 being implemented, the present invention is not limited to such. Rather, any number of side channels 130 may be implemented in conjunction with the explicit channel 120. For example, in some illustrative embodiments, each side channel may operate on a separate characteristic of the voice print extracted from the voice input 110 and may generate a separate indication of authenticity with regard to the different characteristics, e.g., tone, volume, cadence, accent, etc. In some illustrative embodiments, such as ones in which pattern analysis is performed, such as for swipes on an input device, for example, one channel may be used to extract and authenticate the pattern swiped by the user, and one or more side channels may be used to evaluate biometric characteristics, e.g., fingerprint authentication, and/or other non-knowledge-based characteristics of the input. For example, a second channel may be provided to extract and authenticate characteristics of the input corresponding to the pressing force on the touch screen, a third channel may be provided to extract and authenticate stroke thickness in different positions of the pattern, and a fourth channel may be provided to extract and authenticate the direction for drawing the pattern from the input. Any number of channels may be utilized for different characteristics of the input, biometric or otherwise, without departing from the spirit and scope of the present invention.

The results of the authentication processing performed by the multiple channels 120, 130 are combined by authentication verification logic 150 which makes a final determination as to whether the source of the input 110, e.g., the user, is authentic or not. The combining of the various results may take many different forms. For example, in some illustrative embodiments, if any authentication processing of any of the channels 120, 130 indicates that the input 110 is not from an authentic source, then the source (e.g., user) is not authenticated and access to the protected resource may be denied. In other illustrative embodiments, a weighted determination may be made with different weights be provided to different channels 120, 130 based on configuration information indicating a determined level of importance of the various channels to the authentication process. For example, greater weight may be given to the knowledge authentication performed as part of explicit channel 120 than the voiceprint authentication performed as part of the side channel 130. In some illustrative embodiments where greater than two parallel channels are implemented, different weights may be given to each of the various channels. Based on the weighted evaluations, the combined result, e.g., an authentication score, may be compared against one or more threshold values to determine whether the source is authenticated. For example, if the authentication score is equal to or greater than an authentication threshold value, then the source of the input 110 may be considered authentic and access to the protected resource may be granted, otherwise access may be denied.

Based on the combining of the authentication results from the various channels 120, 130, the authentication verification logic 150 determines whether the source of the input 110 is authentic or not and performs an appropriate action based on the result of the determination. For example, if the source of the input 110 is considered authentic, access to the protected resource may be provided. If the source of the input 110 is considered to not be authentic, then access to the protected resource may be denied. Moreover, the access attempt may be logged and/or a notification of the access attempt may be sent to an administrator or other designated person. Various data collected as part of the authentication process may be included in the log entry and/or notification, including the identification of the source from which the input 110 was received.

Thus, with the mechanisms of the illustrative embodiments, a single input may be used to perform a multi-factor authentication of a source of the input. To further illustrate this operation, consider a real-world scenario in which a user of a client computing device 170 attempts to access a protected resource 160 via the authentication computing system 100 according to one illustrative embodiment. The authentication computing system 100 may, via a user interface, audio output, or the like, challenge a user with a security question, e.g., "provide your user id and password." The user responds to the challenge by providing a voice input 110, e.g., "John Smith, A347 . . . QRX8." The voice input 110 is sent to parallel channels 120, 130 for processing. The logic 125 of the explicit channel 120 performs speech-to-text conversion or speech recognition operations on the voice input 110 to identify the purported user as "John Smith" and the security question answer to be "A347QRX8". The logic 125 may retrieve the registry 140 entry for "John Smith" which includes the authentication information that itself includes the correct answer to the security question. If the authentication information indicates that the response "A347QRX8" is the correct response, then the user is authenticated from the viewpoint of the knowledge authentication, otherwise the user is not authenticated.

In the parallel side channel 130, logic 135 processes the voiceprint characteristics of the voice input 110 to determine the authenticity of the various characteristics of the voice print extracted from the voice input 110 based on stored characteristics information, such as in a trained voice model of the authentic user, in the authentication information from the registry 140 entry. For example, in this case, a noticeable feature is that the user pauses between the first 4 characters and last 4 characters of the answer to the security question, i.e. the " . . . " in the above example. Assuming that this is an authentic characteristic of the authorized user, if the voiceprint extracted from the voice input 110 did not have such a characteristic present, e.g., a response of "John Smith, A347QRX8" were provided with no pause, then it may be determined that while the knowledge authentication indicates that the content provided in the voice input 110 is correct, the way in which the content is provided, i.e., the user's voice characteristics, indicate that the user is not the authentic user.

If at least one of the results of the processing by the channels 120, 130 indicates that the user is not authentic, the authentication verification logic 150 may deny access to the protected resource 160 even though the user provided the correct knowledge response, and may log such denial and/or send notifications to appropriate personnel or computing devices. If the processing of both the channels 120, 130 indicate that the user is authentic, then access to the protected resource 160 may be permitted.

Thus, compared to other multi-factor authentication mechanisms that require multiple rounds of input from users, the illustrative embodiments provide a user friendly environment without adding additional burdens on the users, yet providing strong authentication. Other multi-factor authentication methodologies require multiple rounds of back-and-forth verification. The illustrative embodiments only require a single round of input from the user without sacrificing the difficulty imposed on attackers to bypass the security check. The illustrative embodiments further elevate the security requirements to a higher level than adopting a single authentication mechanism alone. Compared with a single authentication methodology, the illustrative embodiments can neutralize forgery attacks by challenging illegitimate users with knowledge based challenges, and further requiring that the attacker not only properly response to knowledge based challenges but do so with proper voice print characteristics. This would require a potential attacker to not only have access to the proper knowledge response to a security question or challenge, but also have sufficient number of voice samples to synthesize a voice print of the authentic user. As a result, the attack surface is greatly reduced and authentication circumvention is made considerably more difficult.

As previously noted above, while a voice input 110 is used as an example to illustrate the inventive aspects of the illustrative embodiments, the illustrative embodiments are not limited to such. Rather, the single input, multi-factor authentication mechanisms of the illustrative embodiments may be applied to various types of input 110 including, but not limited to, voice input, textual input, gesture input, facial recognition input, etc.

For example, with a gesture input embodiment, a pattern matching technique may be used to match the pattern of user "swipes" to authenticate the user. For example, the authentication system 100 may extract the patterns swiped by a user as part of the explicit channel 120 authentication processing and compare the pattern of user swipes to patterns stored in the authentication information of the registry 140 entry. In addition, it is recognized that different users exhibit different touch behavior which leads to different touch signals even for the same patterns. For example, there is a different pressure patterns due to different angles of the hand for left handed users as opposed to right handed users. The fine grained location data in the gesture input 110 may be extracted from touchscreen sensors to build a classification model that is stored in the authentication information of the registry 140 to distinguish a user's touch behavior, and which can then be used to authenticate the user via the one or more side channels 130. That is, during authentication processing by the one or more side channels 130, in parallel with the pattern matching performed by the explicit channel 120, the pattern touch behavior is authenticated as well. This results in a much stronger gesture authentication than testing only the pattern alone. That is, even if the pattern is discovered by an attacker, the attacker would also need to simulate the swiping behavior of the authentic user, e.g., the pressure, area, and angle of the input unit, e.g., hand, stylus, electronic pen, etc.

In another illustrative embodiment, the input 110 may be a text input, such as a password input. In such an embodiment, in the processing by an explicit channel 120, the keystrokes are extracted as the password input and compared to the stored password for the authentic user as retrieved from the registry 140. The timing, pressure applied, and other characteristics of the textual input may be extracted from the text input to generate a model of the user's textual input behavior, which can then be used to perform side channel authentication. That is, during the multi-factor authentication, not only is the actual password input by the user authenticated against the stored password retrieved from the registry 140, but the characteristics of the textual input behavior extracted from the input 110 are compared against the model stored as part of the authentication information in the registry 140 entry. Thus, even if the password were discovered by an attacker, the attacker would still need to be able to emulate the textual input behavior of the authentic user while entering the correct password in order to pass the multi-factor authentication.

Figure 2:
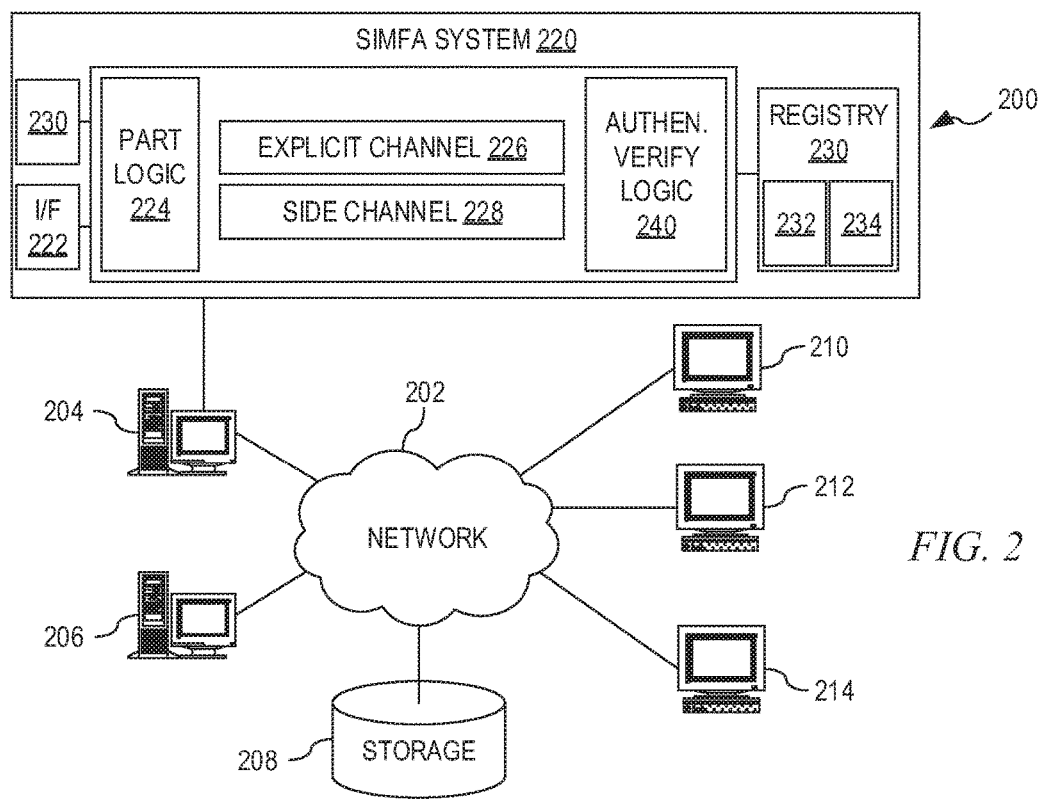
FIG. 2 is an example diagram of a distributed data processing system in which aspects of the illustrative embodiments may be implemented.
Figure 3:
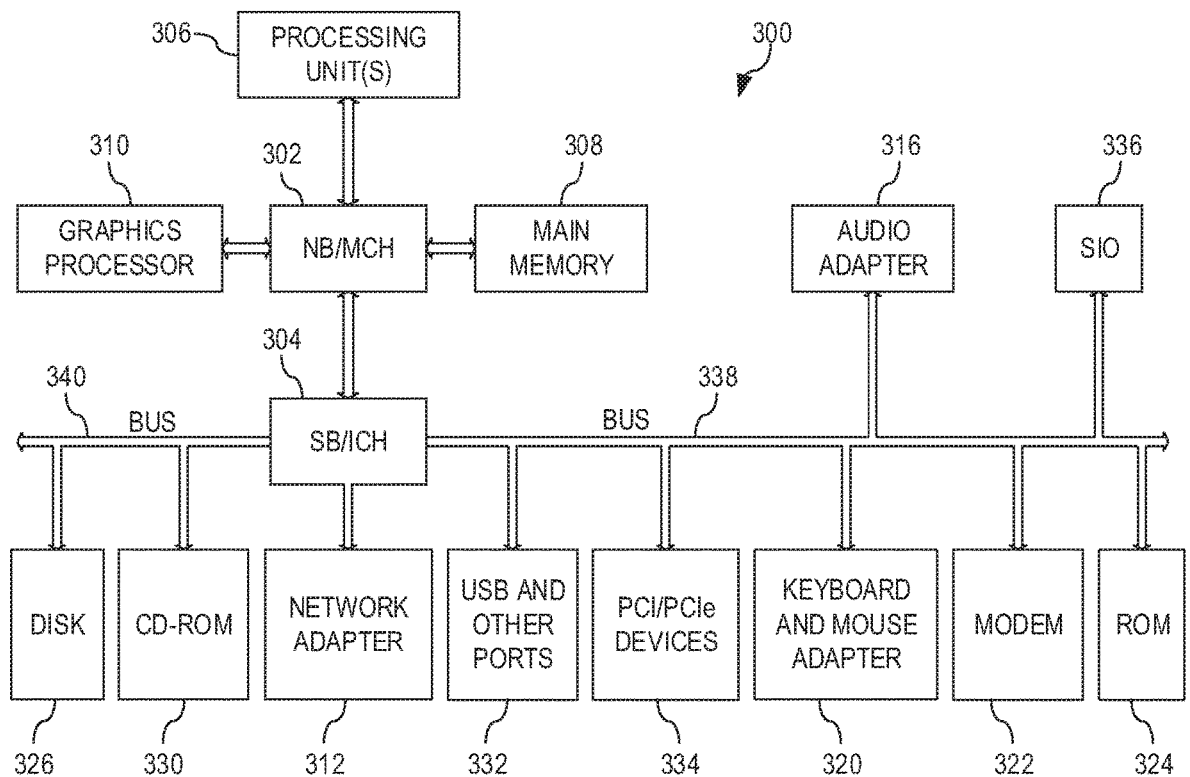
FIG. 3 is an example block diagram of a computing device in which aspects of the illustrative embodiments may be implemented.

As is apparent from the above description, the invention is specifically directed to a computing environment and specifically to addressing the issues associated with computer based authentication of users via a multi-factor authentication protocol. As such, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

As shown in FIG. 2, one or more of the computing devices, e.g., server 204, may be specifically configured to implement a single input, multi-factor authentication (SIMFA) system 220, which may comprise the authentication system 100 in FIG. 1, for example, in some illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates multi-factor authentication of a single input without requiring multiple rounds of user input to perform the multi-factor authentication.

As shown in FIG. 1, the multi-factor authentication (SIMFA) system 220 comprises interface logic 222 through which input is received for multi-factor authentication, such as from a client computing device 210 or directly into the server 204 via an associated input device (not shown). Partitioning logic 224 that partitions the received input to provide the received input, or portions thereof, to appropriate parallel channels 226-228 of the authentication processing, which comprises an explicit channel 226 and one or more side channels 228. The logic of the parallel channels 226-228 may perform their various authentication operations based on authentication information stored in a registry 230, which may include one or more input models 232 which represent various types of input characteristics, and knowledge information 234. The SIMFA system 220 may further comprise authentication verification logic 240 that combines the results of the various authentication processing of the parallel channels 226-228 to determine whether or not the received input is from an authenticate source or not and perform an appropriate action based on the results, e.g., allow or deny access to protected resources.

As noted above, the mechanisms of the illustrative embodiments utilize specifically configured computing devices, or data processing systems, to perform the operations for multi-factor authentication of a single input. These computing devices, or data processing systems, may comprise various hardware elements which are specifically configured, either through hardware configuration, software configuration, or a combination of hardware and software configuration, to implement one or more of the systems/subsystems described herein. FIG. 3 is a block diagram of just one example data processing system in which aspects of the illustrative embodiments may be implemented. Data processing system 300 is an example of a computer, such as server 204 in FIG. 2, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 204. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described herein with regard to the single input, multi-factor authentication (SIMFA) system, such as 100 in FIG. 1 or 220 in FIG. 2.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
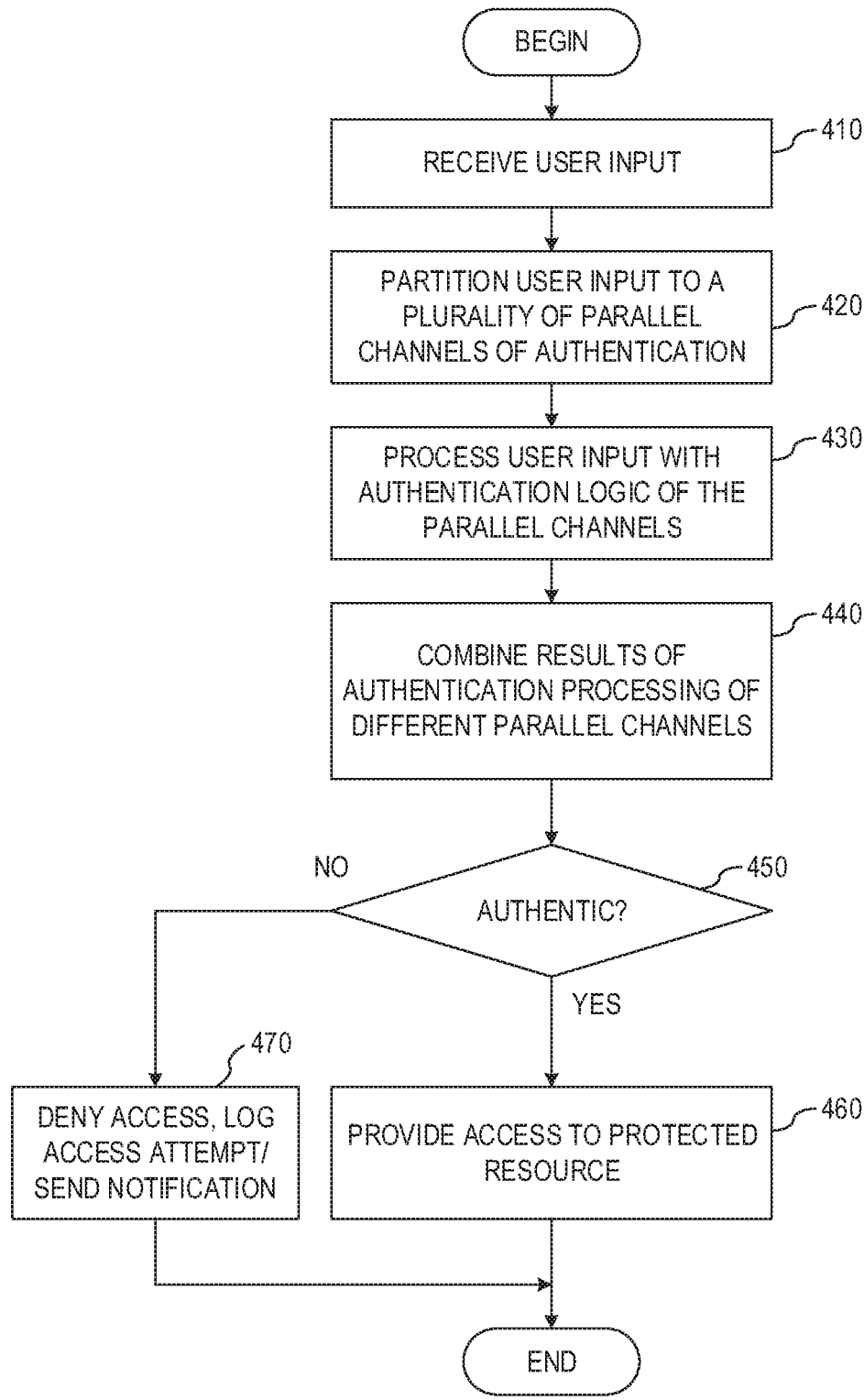
FIG. 4 is a flowchart outlining an example operation for performing multi-factor authentication based on a single input channel in accordance with one illustrative embodiment.

FIG. 4 is a flowchart outlining an example operation for performing multi-factor authentication based on a single input channel in accordance with one illustrative embodiment. As shown in FIG. 4, the operation starts by receiving a user input for authentication, e.g., a voice input, gesture input, textual input, etc. (step 410). The user input is partitioned out to a plurality of parallel channels of authentication processing including an explicit channel for knowledge authentication and one or more side channels for non-knowledge characteristics authentication (step 420). The authentication logic of the various channels operate on their partitioned input to determine if the input is authentic from the view of the particular factor that the channel authenticates (step 430). The results of the separate channel authentication operations are combined by the authentication verification logic to generate a final determination as to whether the input is from an authentic source (step 440). In response to the determination (step 450) being that the source of the input is authentic, access to the protected resource is permitted (step 460). In response to the determination (step 450) being that the input is not authentic, the access is denied and the access attempt is logged and/or a notification is output to appropriate personnel (step 470). The operation then terminates.

Thus, the illustrative embodiments provide mechanisms for implementing logic to perform single input, multi-factor authentication of a user input. This provides an improved user experience whereby a user need only provide a single input, however the increased security capabilities of multi-factor authentication are made possible. As a result, multi-factor authentication is made possible without having to have multiple back-and-forth rounds of challenge and user response.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the processor to configure the processor to implement a single input, multi-factor authentication, the method comprising:
receiving, from a touchscreen input device, a single user gesture input for authenticating a user;
executing, by first authentication logic of an explicit channel, first authentication processing of gesture pattern content of the single user gesture input to generate a first authentication result based on a determined level of correctness of the gesture pattern content relative to stored authentic gesture pattern data corresponding to an authorized user;
executing, by second authentication logic of one or more side channels, second authentication processing of at least one touch characteristic of the single user gesture input to generate a second authentication result based on a determined level of correspondence of the at least one touch characteristic with at least one authentic touch characteristic of the authorized user;
combining results of the first authentication processing and the second authentication processing to generate a final determination of an authenticity of the user; and
generating an output indicating whether the user is an authentic user or a non-authentic user based on the final determination of authenticity of the user.

2. The method of claim 1, wherein executing, by the first authentication logic of the explicit channel, and executing, by the second authentication logic of one or more side channels, are performed in parallel at substantially a same time.

3. The method of claim 1, wherein the at least one touch characteristics comprise a pressing force on the touchscreen at one or more points along a pattern specified by the pattern content, a stroke thickness at one or more points along the pattern specified by the pattern content, and a direction of drawing the pattern specified by the pattern content.

4. The method of claim 1, wherein the one or more non-knowledge-based characteristics comprise a biometric characteristic of the user input.

5. A computer program product comprising a non-transitory computer readable medium having a computer readable program stored therein, wherein the computer readable program, when executed on a data processing system, causes the data processing system to implement a single input, multi-factor authentication (SIMFA) system, that performs the operations:
   receiving, from a touchscreen input device, a single user gesture input for authenticating a user;
   executing, by first authentication logic of an explicit channel, first authentication processing of gesture pattern content of the single user gesture input to generate a first authentication result based on a determined level of correctness of the gesture pattern content relative to stored authentic gesture pattern data corresponding to an authorized user;
   executing, by second authentication logic of one or more side channels, second authentication processing of at least one touch characteristic of the single user gesture input to generate a second authentication result based on a determined level of correspondence of the at least one touch characteristic with at least one authentic touch characteristic of the authorized user;
   combining results of the first authentication processing and the second authentication processing to generate a final determination of an authenticity of the user; and
   generating an output indicating whether the user is an authentic user or a non-authentic user based on the final determination of authenticity of the user.

6. The computer program product of claim 5, wherein executing, by the first authentication logic of the explicit channel, and executing, by the second authentication logic of one or more side channels, are performed in parallel at substantially a same time.

7. The computer program product of claim 5, wherein the at least one touch characteristics comprise a pressing force on the touchscreen at one or more points along a pattern specified by the pattern content, a stroke thickness at one or more points along the pattern specified by the pattern content, and a direction of drawing the pattern specified by the pattern content.

8. The computer program product of claim 5, wherein the one or more non-knowledge-based characteristics comprise a biometric characteristic of the user input.

9. An apparatus comprising:
   a processor; and
   a memory coupled to the processor, wherein the memory comprises instructions which, when executed by the processor, cause the processor to implement a single input, multi-factor authentication (SIMFA) system, that performs the operations:
   receiving, from a touchscreen input device, a single user gesture input for authenticating a user;
   executing, by first authentication logic of an explicit channel, first authentication processing of gesture pattern content of the single user gesture input to generate a first authentication result based on a determined level of correctness of the gesture pattern content relative to stored authentic gesture pattern data corresponding to an authorized user;
   executing, by second authentication logic of one or more side channels, second authentication processing of at least one touch characteristic of the single user gesture input to generate a second authentication result based on a determined level of correspondence of the at least one touch characteristic with at least one authentic touch characteristic of the authorized user;
   combining results of the first authentication processing and the second authentication processing to generate a final determination of an authenticity of the user; and
   generating an output indicating whether the user is an authentic user or a non-authentic user based on the final determination of authenticity of the user.

10. The method of claim 1, wherein the one or more side channels comprise at least two side channels, each side channel in the at least two side channels processing a different touch characteristic of the at least one touch characteristic.

11. The method of claim 10, wherein at least one of the side channels in the at least two side channels is a side channel that processes the single user gesture input by performing a fingerprint authentication operation that authenticates a fingerprint of the user providing the single user gesture input.

12. The method of claim 10, wherein at least one of the side channels in the at least two side channels is a side channel that processes the single user gesture input by performing a pressing force authentication operation that authenticates a pattern of pressing force data representing pressing force at various points along the gesture pattern of the user gesture input.

13. The method of claim 10, wherein at least one of the side channels in the at least two side channels is a side channel that processes the single user gesture input by performing a stroke thickness authentication operation that authenticates a stroke thickness pattern representing an amount of area of the user's finger or writing instrument used to input the gesture pattern at various points along the gesture pattern of the single user gesture input.

14. The method of claim 10, wherein at least one of the side channels in the at least two side channels is a side channel that processes the single user gesture input by performing a drawing direction authentication operation that authenticates a direction pattern of strokes in the gesture pattern of the user gesture input.

15. The computer program product of claim 5, wherein the one or more side channels comprise at least two side channels, each side channel in the at least two side channels processing a different touch characteristic of the at least one touch characteristic.

16. The computer program product of claim 15, wherein at least one of the side channels in the at least two side channels is a side channel that processes the single user gesture input by performing a fingerprint authentication operation that authenticates a fingerprint of the user providing the single user gesture input.

17. The computer program product of claim 15, wherein at least one of the side channels in the at least two side channels is a side channel that processes the single user gesture input by performing a pressing force authentication operation that authenticates a pattern of pressing force data representing pressing force at various points along the gesture pattern of the user gesture input.

18. The computer program product of claim 15, wherein at least one of the side channels in the at least two side channels is a side channel that processes the single user gesture input by performing a stroke thickness authentication operation that authenticates a stroke thickness pattern representing an amount of area of the user's finger or writing instrument used to input the gesture pattern at various points along the gesture pattern of the single user gesture input.

19. The computer program product of claim 15, wherein at least one of the side channels in the at least two side channels is a side channel that processes the single user gesture input by performing a drawing direction authentication operation that authenticates a direction pattern of strokes in the gesture pattern of the user gesture input.

20. The apparatus of claim 9, wherein the one or more side channels comprise at least two side channels, each side channel in the at least two side channels processing a different touch characteristic of the at least one touch characteristic.

21. The apparatus of claim 20, wherein at least one of the side channels in the at least two side channels is a side channel that processes the single user gesture input by performing a fingerprint authentication operation that authenticates a fingerprint of the user providing the single user gesture input.

22. The apparatus of claim 20, wherein at least one of the side channels in the at least two side channels is a side channel that processes the single user gesture input by performing a pressing force authentication operation that authenticates a pattern of pressing force data representing pressing force at various points along the gesture pattern of the user gesture input.

23. The apparatus of claim 20, wherein at least one of the side channels in the at least two side channels is one of:
 a side channel that processes the single user gesture input by performing a stroke thickness authentication operation that authenticates a stroke thickness pattern representing an amount of area of the user's finger or writing instrument used to input the gesture pattern at various points along the gesture pattern of the single user gesture input, or
 a side channel that processes the single user gesture input by performing a drawing direction authentication operation that authenticates a direction pattern of strokes in the gesture pattern of the user gesture input.

* * * * *